United States Patent [19]

Otto

[11] Patent Number: 5,022,659
[45] Date of Patent: Jun. 11, 1991

[54] SEAL ASSEMBLY FOR ANTIFRICTION BEARINGS

[75] Inventor: Dennis L. Otto, Malvern, Ohio

[73] Assignee: The Timken Company, Canton, Ohio

[21] Appl. No.: 455,758

[22] Filed: Dec. 22, 1989

Related U.S. Application Data

[63] Continuation-in-part of Ser. No. 289,722, Dec. 27, 1988, abandoned.

[51] Int. Cl.⁵ .............................................. F16J 15/32
[52] U.S. Cl. ........................................ 277/1; 277/134; 277/152; 384/486
[58] Field of Search .................. 277/1, 35, 38, 40, 45, 277/47, 82, 95, 178, 134, 152; 384/481, 482, 484, 485, 486

[56] References Cited

U.S. PATENT DOCUMENTS

| | | | |
|---|---|---|---|
| 2,195,794 | 4/1940 | Weckstein . | |
| 2,810,592 | 10/1957 | Williams | 277/25 X |
| 2,823,936 | 2/1958 | Shafer | 384/482 X |
| 3,021,161 | 2/1962 | Rhoads et al. . | |
| 3,306,223 | 2/1967 | Liebig | 277/38 X |
| 3,363,911 | 1/1968 | McKinven, Jr. | 277/82 X |
| 3,510,138 | 5/1970 | Bowen et al. . | |
| 3,510,138 | 5/1970 | Bowen et al. | 277/35 X |
| 3,973,781 | 8/1976 | Grorich . | |
| 4,106,781 | 8/1978 | Benjamin et al. | 277/82 |
| 4,185,838 | 1/1988 | Danner . | |
| 4,311,346 | 1/1982 | Danner . | |
| 4,434,985 | 3/1984 | Sonnerat . | |
| 4,497,495 | 2/1985 | Christiansen . | |
| 4,516,783 | 5/1985 | Mitsue et al. . | |
| 4,655,618 | 4/1987 | Labedan et al. | 384/486 |
| 4,669,895 | 6/1987 | Colanzi et al. | 384/486 X |
| 4,726,696 | 2/1988 | Dickinson et al. | 384/486 X |
| 4,755,067 | 7/1988 | Asberg et al. | 384/482 |
| 4,770,425 | 9/1988 | Colanzi . | |
| 4,772,138 | 9/1988 | Dreschmann et al. | 277/134 X |
| 4,792,242 | 12/1988 | Colanzi et al. | 384/482 |
| 4,792,243 | 12/1988 | Takeuchi et al. | 384/486 |
| 4,863,292 | 9/1989 | Dreschmann et al. | 384/482 |

FOREIGN PATENT DOCUMENTS

| | | | |
|---|---|---|---|
| 2510221 | 7/1981 | France . | |
| 8500188 | 2/1985 | PCT Int'l Appl. . | |
| 2030236 | 6/1979 | United Kingdom . | |
| 2136891 | 2/1984 | United Kingdom . | |
| 2130310 | 5/1984 | United Kingdom | 384/486 |
| 2204647 | 4/1988 | United Kingdom . | |

OTHER PUBLICATIONS

SAE Technical Paper Series Specification and Seal Development for Passenger Vehicle Wheel Bearings 10/19–22/87.

Primary Examiner—William A. Cuchlinski, Jr.
Assistant Examiner—Scott Cummings
Attorney, Agent, or Firm—Gravely, Lieder & Woodruff

[57] ABSTRACT

A seal assembly for antifriction bearings in which a cone and a cup have raceways for roller bearings, a seal case carried by the cone and by the cup for supporting a seal element on each of the seal cases to provide a space therebetween for retention of a body of lubricant in position to create a barrier for blocking the ingress of contaminants from the exterior. One of the seals is positioned to be exposed to the outside to have a lip operative on one of the seal cases to preclude the ingress of contaminants, and the other one of the seals is exposed to the bearing interior to allow lubricant to pass into the cavity between the seals and also to assure the presence of lubricant to the interior of the bearing assembly.

7 Claims, 1 Drawing Sheet

SEAL ASSEMBLY FOR ANTIFRICTION BEARINGS

BACKGROUND OF THE INVENTION

1. Field of the Invention

This invention is directed to antifriction bearings employing a minimum of space for lubricant containment seals, and providing a desired degree of axial movement without impairing the seal.

2. Description of the Prior Art

Antifriction bearings incorporate seals of various kinds for the purpose of retaining the lubricant while excluding contaminants, whereby the useful life of such bearings can be extended. In considering the prior art there is a big problem of selecting a bearing size that will accommodate the most effective seal for excluding contaminants while retaining the lubricant. Heretofore, bearings have been sized to best accommodate seals that will perform the requirements of lubricant retention and contaminant exclusion. In certain instances where bearings need to be small or down-sized there are limitations which must not be exceeded because of the need for space to receive an effective seal at each end of the bearing assembly. Examples of bearing seals that do not lend themselves to further down-sizing are the following:

Sonnerat U.S. Pat. No. 4,434,985 of Mar. 6, 1984; Christiansen U.S. Pat. No. 4,497,495 of Feb. 5, 1985; Mitsue et al U.S. Pat. No. 4,516,783 of May 14, 1985; and Colanzi et al 4,770,425 of Sept. 13, 1988.

The prior art also includes a SAE Technical Paper Series 871982 on Specification and Seal Development for Passenger Vehicle Wheel Bearings by J. C. M. Bras, dated Oct. 19-22, 1987.

SUMMARY OF THE INVENTION

The present invention is directed to overcoming the problems so evident in the prior art, such problems being briefly enumerated as one in which there is water entrapment by the seals, or three or more seal lips engaged in the seal case increase the torque on the rotating parts, or the presence of one or more face seals which increase friction and generate heat. In addition there are heat and wear problems when the seal lips operate in contact without flat radial flanges or in contact on angled surfaces.

The present invention overcomes other problems of the prior art and that is being able with a simple two-element seal assembly to incorporate it in the smallest functional structure that can be produced with today's manufacturing technology, whereby more room is made available for the rolling elements of the bearing, thus resulting in the largest possible bearing rating for a particular bearing envelope.

It is an object also to eliminate special provisions for supporting the seals in a bearing assembly, and avoiding the need to separately assemble the seals so the manufacturing costs can be reduced.

A further object of the present invention is to provide a grease pumping means associated with a flinger in the seal assembly to improve retention of grease, and to dispose the flinger in a position to allow the seal to be located closer to the rolling elements so the bearing assembly can be reduced in overall dimension allowing more space for the rolling elements while adapting the bearing for miniaturization.

In one form of the invention a cavity is defined in the bearing assembly by a pair of nested seal cases which form a cavity axially aligned with rolling elements, and seal elements are carried by the nested seal cases to serve as retainers for a body of grease or lubricant which keeps the seal elements pliable as long as possible so the seal life is extended beyond the current life expectancy of bearing seals. The cavity is filled with the lubricant at the time the seal assembly is made or it can be filled at the time the bearing assembly is initially used by overfilling the assembly so that a body of lubricant passes one seal element to enter the cavity.

Once the cavity is filled, a back pressure by pumping means is created to prevent additional lubricant leakage, and the lubricant body in the cavity provides a significant barrier to ingress of contaminants. Over time the trapped lubricant becomes stiff and increases its resistance to ingress of contaminants.

A further object is to form a cavity in the seal assembly that will contain grease in service so that the outboard sealing lip can be kept lubricated as long as possible, extending the life of the lip as much as possible. The cavity could be filled with grease at the time the seal is manufactured. However, it is the object to lubricate this cavity by overlubricating the bearing assembly so that when the bearing begin operation, grease is forced past a slinger. While the bearing operating speed is slow and the slinger is ineffective due to the slow speed, lubricant passes through a radial sealing lip which is directed to open as internal bearing pressure is being developed in the bearing assembly due to the heat of operation. This all takes place in the first few revolutions of the bearing assembly the first time the bearing assembly is used. Once the cavity is filled with grease, the sealing lip is kept lubricated.

The back pressure created by the grease fills the cavity and prevents additional grease leakage once the bearing assembly is no longer overlubricated with grease. The grease-filled cavity provides a significant barrier to contaminant ingress and protects the sealing lip from any contaminants which manage to pass through the sealing lip. Over an extended period of time, as dirt enters the cavity, the ring of grease in the cavity becomes stiff in texture, increasing its resistance to further dirt ingress. As the ratio of dirt to grease in the cavity increases, the resistance to further dirt ingress increases and the ability of the grease to lubricate the sealing lip decreases.

Eventually in a very severe service environment, such as provided by wheel bearings on four wheel drive trucks, the seals could wear sufficiently to become loose relative to the seal cases. When this occurs, the seals continue to function as a close clearance labyrinth and as a contaminant excluding slinger due to the shape of the seal which is angled to impel contaminants away from the interface between the seals and seal cases.

If water enters the cavity after the seal is worn so that an interference fit is no longer provided with the seal cases, the water will flow out of the cavity under static conditions since the interface between the seals and seal cases is at the lowest point in the cavity. Under dynamic conditions the slinger effect of the seals will impel water out of the cavity.

The seals are kept lubricated throughout the life of the application by lubricant passing the slinger each time the bearing assembly is stopped and started. Therefore, the final barrier to contaminant ingress, is held in reserve in new condition until the seals have worn loose relative to the seal case.

DETAILED DESCRIPTION OF THE PREFERRED EMBODIMENT

Figure 1:
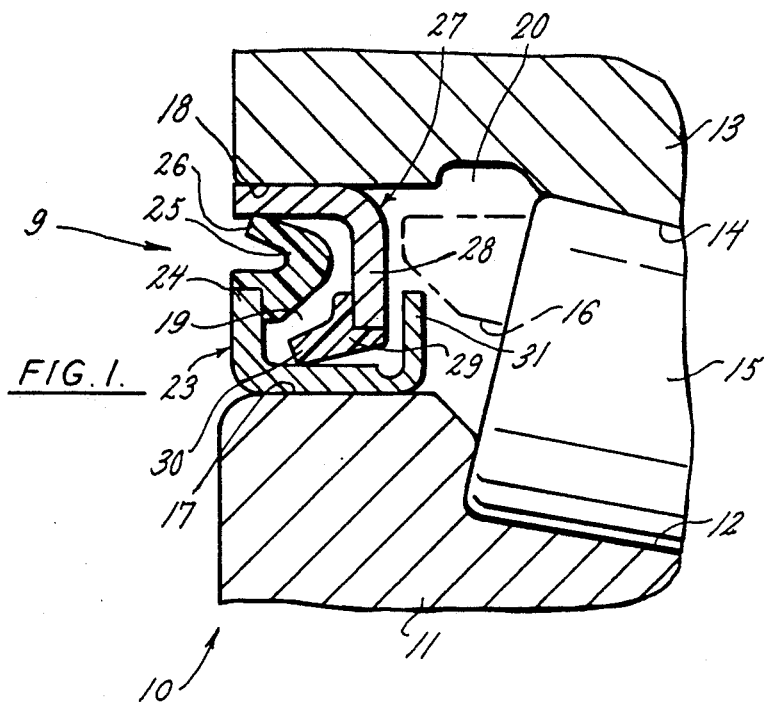
FIG. 1 is a fragmentary sectional view of a roller bearing assembly embodying the principals of this invention.

The environment of the present seal assembly 9 is illustrated in FIG. 1 where a fragmentary view of a typical roller bearing 10 is shown. That assembly includes an inner component 11 which is a cone having a tapering raceway 12, an outer component 13 which is a cup having a tapering raceway 14. A typical tapered roller element 15 is shown in operative position between the raceways 12 and 14. Normally the tapered rollers 15 are guided by a cage assembly fragmentarily seen in dotted outline at 16.

The cone component 11 and cup component 13 present opposed outer axially directed surfaces 17 and 18 for the reception of the two-part seal assembly 9 which encloses a cavity 19 between the seal elements to be referred to presently, and that assembly is adapted to retain the lubricant in adjacent bearing cavity 20 while excluding contaminants.

In the view of FIG. 1 the cone component 11 has the outer axially directed surface 17 supporting a first seal case 23 which is formed with a flange 24 which carries an elastomeric seal element 25 which is bonded to the flange 24 so as to provide a lip 26 which rides on the inner surface of a second seal case 27 carried on the axially directed surface 18 of the cup component 13. It is also shown in FIG. 1 that the second seal case 27 has a projection 28, the inner end of which supports a second elastomeric seal 29 having a lip 30 engaged on the inner surface of the first seal case 23. It is also seen in FIG. 1 that the first seal case 23 is formed with a slinger 31 that projects into the bearing cavity 20 for the purpose of centrifically directing the lubricant upwardly so that it will migrate along the tapered rollers 15 so as to provide adequate lubrication for the rollers along the surface raceways 12 and 14.

Figure 2:
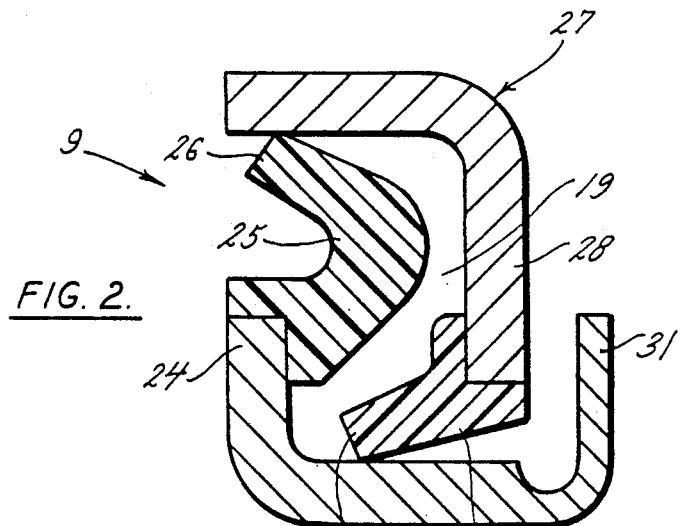
FIG. 2 is an enlarged sectional view of a typical seal assembly adapted for the environment of FIG. 1.

The seal arrangement shown in FIGS. 1 and 2 of the drawings is a simple self-contained assembly using only two seals 25 and 29 which incorporate radial lips 26 and 30 that close off, an internal cavity 19 which improves the exclusion of contaminants and allows the seal to be produced in small cross-sectional sizes. This means that for a given amount of space in an antifriction bearing, most of the space can be used for the bearing rollers since the cross-sectional area of the seals is substantially reduced. This results in higher bearing ratings which is very important in antifriction wheel bearing design. It is also pointed out that with bearing components of the smaller size, it is still possible to provide the load carrying needs that are encountered in miniaturized bearing designs. The bearing shown in the drawings having the simple two seals 25 and 29 maximizes the lubricant retention capability and contaminant exclusion with effective seals occupying the smallest possible space. A particular advantage is realized in the bearing assembly of FIG. 1 and that is the axial relative movement of either the cone 11 or cup 13 with respect to the other does not affect the seal as the seal lips 26 and 30 are able to slide while retaining the lubricant.

Looking at FIG. 2, the inner seal case body 23 is spaced radially inwardly of the outer seal) case body 27 so that the projection 24 on the body 23 and projection 28 on the body 27 partially define a cavity 19 that is closed off by the seal elements 25 and 29 due to the lips 26 and 30 riding respectively on the inner surface of body 27 and the inner surface of body 23. The lips 26 and 30 form line contacts with the seal case bodies 27 and 23 to reduce the friction drag.

Figure 3:
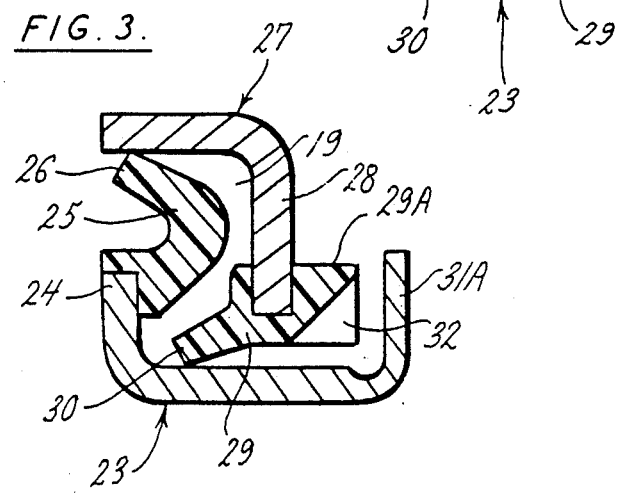
FIG. 3 is a sectional view of the seals and seal case of modified character used in the environment of FIG. 1.

Looking at FIG. 3, the seal element 29 has been modified by the addition of an extension 29A, and the repositioning of the slinger 31A farther away from the projection 28 on seal case 27. Increasing the space allows the formation of the extension 29A and the further notching thereof at 32 to constitute the notches as grease pumping vanes.

Figure 4:
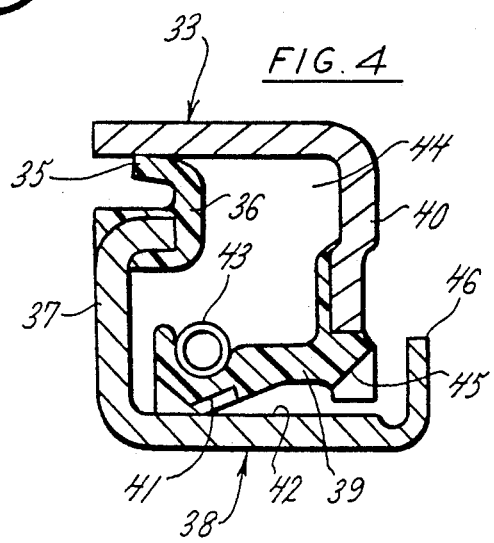
FIG. 4 is a further sectional view of a modified seal assembly having positive grease seal and grease pumping means.

The seal assembly seen in FIG. 4 illustrates a further modification for a bearing seal where the axial movement of the cone and cup is expected to be greater than with the bearing seal assemblies of FIGS. 1-3. The seal case 33 provides a longer axial surface 34 to accommodate the line contact of seal lip 35 on the seal body 36 which is molded into position on the radial portion 37 of the seal case 38. The second seal body 39 is molded onto the portion 40 of the seal case 33. This seal body 39 has a lip seal 41 held in working relation to the seal case surface 42 by a garter spring 43 located in the chamber 44. The seal body 39 is formed with notches 45 presented to the space inside the slinger element 46 to function as pumping vanes. The construction seen in FIGS. 3 and 4 have the pumping vanes 32 and 45 to assure lubricant retention in the bearing for increasing bearing life.

The foregoing disclosure also relates to a method of retaining lubricant in a bearing assembly and employing that lubricant as a barrier to the passage or propagation of contaminants from the exterior to the interior where it can accelerate wear on the rollers and roller raceways. Such a method embodies the provision of a pair of seal elements, each carried by a different seal case to form a cavity between the seal elements, and the step of initially supplying the lubricant in such quantity that it pushes past one seal element and substantially fills the cavity between the seal elements in sufficient quantity to form a barrier in the cavity to intercept the propagation of contaminants into the bearing from the exterior. The pumping vanes 32 or 45 assure retention of lubricant entering the space between the cup and cone to lubricate the rolling elements.

The foregoing details of construction and operation have set forth a preferred embodiment where two-seal components can be incorporated in an extremely limited space in antifriction bearings without sacrificing lubricant retention and contaminant exclusion. In the assembly shown, distribution of the lubricant can easly be controlled by means of a slinger element embodied in the seal assembly. The characteristics of the present two-seal bearing assembly may be modified in the manner seen in FIGS. 3 or 4 without sacrificing the desirable characteristics illustrated in the drawings.

For example, one of the seals has a lip in working line contact on a seal case in position to resist passage of contaminants from the outside to the interior. The other one of the seals has a lip in working line contact on a seal case in position to allow passage of lubricant from the interior of the bearing assembly to the space between the seals and resist reverse passage of lubricant back to the interior of the bearing. The seal cases 23 and 27 each carry a seal such as seal 25 on case 23, and seal 29 on case 27. The positioning of the seal lips 26 and 30 is such that each has an effective angular position to resist passage of material in one direction and to yield to the passage of material in an opposite direction.

For example, seal 29 is angularly sloped relative to the seal case 23 so it can elevate to allow lubricant to pass into the cavity 19, but any reverse movement tends to press the seal lip 30 against the seal case. The same reaction is evident for the seal 25 as the angular slope of lip 26 can allow it to lift off the seal case 27 under pressure of lubricant from the cavity 19 to escape to the exterior. But reverse movement of contaminants tends to press the seal lip 26 against the seal case 27.

What is claimed is:

1. A seal assembly having an annular configuration adapted for use in antifriction tapered roller bearings having cups and cones with interposed tapered rolling elements having limited axial freedom of movement, the seal assembly forming a barrier for the exclusion of contaminants and the retention of lubricants during both rotational and axial movement, said seal assembly comprising:
    (a) a pair of annular cases in radially spaced relation with one of said cases having a radially directed flange in axially spaced relation to a radially directed flange on the other one of said cases, and said cases having axially directed surfaces for engaging on the bearing cup and cone respectively;
    (b) a seal element carried by each of said radially directed case flanges; and
    (c) each seal element having a lip directed in the same axial direction and slidably engaged in line contact against the axially directed surface on the radially opposite one of said annular cases, and said seal elements and annular cases being spaced apart to define and enclose a single cavity in said seal assembly between said pair of annular cases in which said seal elements are directly exposed to each other in said cavity.

2. The seal assembly set forth in claim 1 wherein one of said seal elements has its lip in a position between said pair of annular cases to present the line contact position of that one seal element to the exterior contaminants.

3. The seal assembly set forth in claim 2 wherein said one seal element is positioned at an angle effective to exclude contaminant and to allow escape of lubricants on movement of said seal cases to reduce the volume of said single enclosed cavity.

4. The seal assembly set forth in claim 1 wherein one of said seal elements has its lip in a position between said pair of annular cases to be exposed to the space in said enclosed single cavity of said seal assembly.

5. The seal assembly set forth in claim 1 wherein one of said seal elements carried by one of said radially directed case flanges is formed with a lubricant pumping element in position thereon for assuring the retention of lubricant in communication with the tapered rolling elements, said pumping elements having an angularly directed face.

6. A seal assembly having an annular configuration adapted for use in antifriction rolling element bearings to form a barrier to exclude ingress of contaminants to the bearing and the retention of lubricant substantially free of contaminants in said seal assembly comprising:
    (a) a pair of seal cases in radially spaced relation, said seal cases each having oppositely directed radially oriented flange portions in axially spaced and overlapping spaced relation and axially directed portions in overlapping radially spaced relation, said pair of seal cases defining predetermined limits of a cavity therebetween.
    (b) a pair of seal elements carried one on each of said radially oriented flange portions of said seal cases and each seal element having a lip positioned to be in the same orientation and in substantial line contact sealing engagement upon said axially directed portion of a radially and overlapping opposite seal case; and
    (c) each of said seal elements, in combination with said seal cases, effectively seal off said cavity within said seal assembly, each of said seal elements having a portion extending in a direction assuming an angular relation with respect to said axially directed portions of said seal case so as to resist movement of contaminants into said cavity and lubricant inwardly into the rolling elements of said bearing assembly.

7. A method of retaining lubricant supplied into an antifriction bearing assembly having a cone and a cup with rolling elements between said cone and cup, the method comprising:
    (a) providing first and second seal cases on and between said cup and cone to define the substantially rigid limits of a cavity therebetween;
    (b) mounting a relatively yieldable seal element on each of said seal cases such that a body of lubricant is retained in the cavity formed therebetween and wherein one seal element is exposed to the exterior of the bearing assembly in position to resist tot he ingress of contaminants while yielding to the ingress of lubricant into the cavity and the other seal element is exposed to the interior of the bearing assembly in position to resist to the passage of lubricant from the body of lubricant in the cavity in a direction to communicate with the rolling elements while yielding to the passage of lubricant into the cavity to replenish the body of lubricant therein; and
    (c) providing lubricant pumping means on the other one of the seal elements to assist the latter sealing element to retain lubricant in the bearing assembly to assure the presence of lubricant for the rolling elements.

* * * * *